(12) United States Patent
Ahirwar

(10) Patent No.: US 11,005,509 B2
(45) Date of Patent: May 11, 2021

(54) ACTIVE TONE CANCELLER

(71) Applicant: NXP USA, Inc., Austin, TX (US)

(72) Inventor: Vijay Ahirwar, Pune (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/845,399

(22) Filed: Apr. 10, 2020

(65) Prior Publication Data

US 2020/0343921 A1    Oct. 29, 2020

Related U.S. Application Data

(60) Provisional application No. 62/838,845, filed on Apr. 25, 2019.

(51) Int. Cl.
*H04B 1/00* (2006.01)
*H04B 15/00* (2006.01)
*H04B 1/10* (2006.01)

(52) U.S. Cl.
CPC ... *H04B 1/1036* (2013.01); *H04B 2001/1063* (2013.01)

(58) Field of Classification Search
CPC ...... H04B 1/04; H04B 1/0475; H04B 1/1027; H04B 1/16; H04B 1/123; H04B 1/40; H04B 15/02; H04B 15/04; H04B 15/06; H04B 17/101; H04B 17/18; H04B 17/21; H04B 17/309

See application file for complete search history.

(56) References Cited

U.S. PATENT DOCUMENTS

| | | | |
|---|---|---|---|
| 7,924,904 B2 * | 4/2011 | Gaikwad | H04B 15/06 375/139 |
| 8,081,946 B2 * | 12/2011 | Fudge | H04B 1/1036 455/295 |
| 9,431,997 B1 * | 8/2016 | Comeau | H04B 1/1009 |
| 9,503,138 B2 * | 11/2016 | Brunn | H04B 1/1036 |
| 9,749,006 B1 * | 8/2017 | Kose | H04B 1/10 |
| 9,780,945 B1 * | 10/2017 | Avivi | H04B 15/02 |

* cited by examiner

*Primary Examiner* — Quochien B Vuong

(57) ABSTRACT

An active canceller includes a magnitude estimator, a phase estimator, a tone generator, and a suppressor. The magnitude estimator estimates the magnitude of spurious signals on a channel. The phase estimator estimates the phase of the spurious signals on the channel. The tone generator generates a tone signal based on the estimated magnitude and phase. The suppressor subtracts the tone signal from a channel signal to suppress the spurious signals. The magnitude and phase estimators and the suppressor may operate in the time domain.

18 Claims, 9 Drawing Sheets

ACTIVE TONE CANCELLER

CROSS-REFERENCE TO RELATED APPLICATIONS

This application claims benefit to U.S. Provisional Patent Application Ser. No. 62/838,845, filed Apr. 25, 2019, the contents of which is hereby incorporated by reference for all purposes as fully set forth herein.

FIELD

Example embodiments disclosed herein relate to processing signals to suppress noise.

BACKGROUND

Efforts are continually being made to suppress noise that adversely affects the performance of semiconductor devices, computer systems, and communication networks. One form of noise is generated based on spurious signals that appear as harmonics at certain clock frequencies. The spurious signals may occur, for example, in printed circuits boards and integrated circuit chips, such as but not limited to system-on-chip (SoC) devices. In some cases, the spurious signals may cause interference with Bluetooth and other forms of communication signals.

SUMMARY

In accordance with one or more embodiments, an active canceller includes a magnitude estimator configured to estimate a magnitude of spurious signals on a channel; a phase estimator configured to estimate a phase of the spurious signals on the channel; a tone generator configured to generate a tone signal based on the estimated magnitude and phase; and a suppressor configured to subtract the tone signal from a channel signal to suppress the spurious signals, wherein the magnitude and phase estimators and the suppressor operate in the time domain. The magnitude estimator and the phase estimator may generate the magnitude estimate and the phase estimate, respectively, during a period when an outside signal is not received through the channel.

The magnitude estimator may store samples of the spurious signals over N periods; determine maximal points in each of the one or more time periods; and perform a statistical operation based on the maximal points to calculate the estimated magnitude of the spurious signals, wherein $N \geq 1$. The magnitude estimator may store the samples in a linear feedback shift register, where P samples are stored in the linear feedback shift register for each of the N time periods, where $P \geq 1$. The magnitude estimator may store the samples of the spurious signals before the channel signal is received.

The phase estimator may generate a coarse estimate of the phase of the spurious signals and generate a fine estimate of the phase of the spurious signals based on the coarse estimate of the phase. The phase estimator may generate the coarse estimate by determining a first value of a waveform corresponding to the spurious signals; accessing a look-up table storing sample values for a plurality of reference waveforms; determining at least one reference waveform of the plurality of reference waveforms having a sample value nearest to the first value; and setting the coarse phase estimate based on a phase of the at least one reference waveform.

The phase estimator may generate the coarse estimate by generating a reference waveform based on the estimated magnitude; generating difference values between first points on the reference waveform and second points on a measured waveform generated by the spurious signals, the first points and second points corresponding to a respective number of sample points; and determining a difference value of the difference values having a lowest value; determining a phase angle corresponding to the difference value having the lowest value; and determining the coarse phase estimate based on the phase angle.

The phase estimator may generate the fine estimate by (a) generating a reference waveform based on the coarse phase estimate and the magnitude estimate; (b) shifting the reference waveform by a predetermined phase increment; (c) comparing the shifted reference waveform to a measured waveform corresponding to the spurious signals; (d) generating a difference value based on the comparison; (e) repeating (b) to (d) to generate one or more additional difference values; (f) determining a difference value of the difference values generated in (d) and (e) having a least value; and (g) determining a phase angle of the shifted reference waveform that corresponds to the difference value having the least value; and (h) determining the fine phase estimate based on the phase angle. Operation (c) may include generating first values by subtracting first point values of the shifted reference waveform from second point values of the measured waveform at respective sampling times; and generating a minimum mean square error value based on the first values, wherein the difference value generated in (d) is based on the minimum means square error value.

In accordance with one or more embodiments, a method for suppressing noise in a channel includes estimating a magnitude of spurious signals in the channel; estimating a phase of the spurious signals in the channel; generating a tone signal based on the estimated magnitude and phase; and subtracting the tone signal from the channel signal to suppress the spurious signals, wherein the magnitude and phase of the spurious signals are estimated and the tone signal is subtracted from the channel signal in the time domain.

Estimating the magnitude may include storing samples of the spurious signals over N periods; determining maximal points in each of the one or more time periods; and performing a statistical operation based on the maximal points to calculate the estimated magnitude of the spurious signals, wherein $N \geq 1$. Estimating the magnitude may include storing the samples in a linear feedback shift register, wherein P samples are stored in the linear feedback shift register for each of the N time periods, where $P \geq 1$. Storing the samples of the spurious signals may be performed before the channel signal is received.

Estimating the phase may include generating a coarse estimate of the phase of the spurious signals and generating a fine estimate of the phase of the spurious signals based on the coarse estimate of the phase. Generating the coarse estimate may include determining a first value of a waveform corresponding to the spurious signals; accessing a look-up table storing sample values for a plurality of reference waveforms; determining at least one reference waveform of the plurality of reference waveforms having a sample value nearest to the first value; and setting the coarse phase estimate based on a phase of the at least one reference waveform.

Generating the coarse estimate may include generating a reference waveform based on the estimated magnitude; generating difference values between first points on the reference waveform and second points on a measured waveform generated by the spurious signals, the first points and second points corresponding to a respective number of sample points; and determining a difference value of the difference values having a lowest value; determining a phase angle corresponding to the difference value having the lowest value; and determining the coarse phase estimate based on the phase angle.

Generating the fine estimate may include (a) generating a reference waveform based on the coarse phase estimate and the magnitude estimate; (b) shifting the reference waveform by a predetermined phase increment; (c) comparing the shifted reference waveform to a measured waveform corresponding to the spurious signals; (d) generating a difference value based on the comparison; (e) repeating (b) to (d) to generate one or more additional difference values; (f) determining a difference value of the difference values generated in (d) and (e) having a least value; and (g) determining a phase angle of the shifted reference waveform that corresponds to the difference value having the least value; and (h) determining the fine phase estimate based on the phase angle.

Operation (c) may include generating first values by subtracting first point values of the shifted reference waveform from second point values of the measured waveform at respective sampling times; and generating a minimum mean square error value based on the first values, wherein the difference value generated in (d) is based on the minimum means square error value.

In accordance with one or more embodiments, a system includes a memory configured to store instructions; and a processor configured to execute the instructions to: estimate a magnitude of spurious signals in the channel; estimate a phase of the spurious signals in the channel; generate a tone signal based on the estimated magnitude and phase; and subtract the tone signal from the channel signal to suppress the spurious signals, wherein the magnitude and phase of the spurious signals are estimated and the tone signal is subtracted from the channel signal in the time domain.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
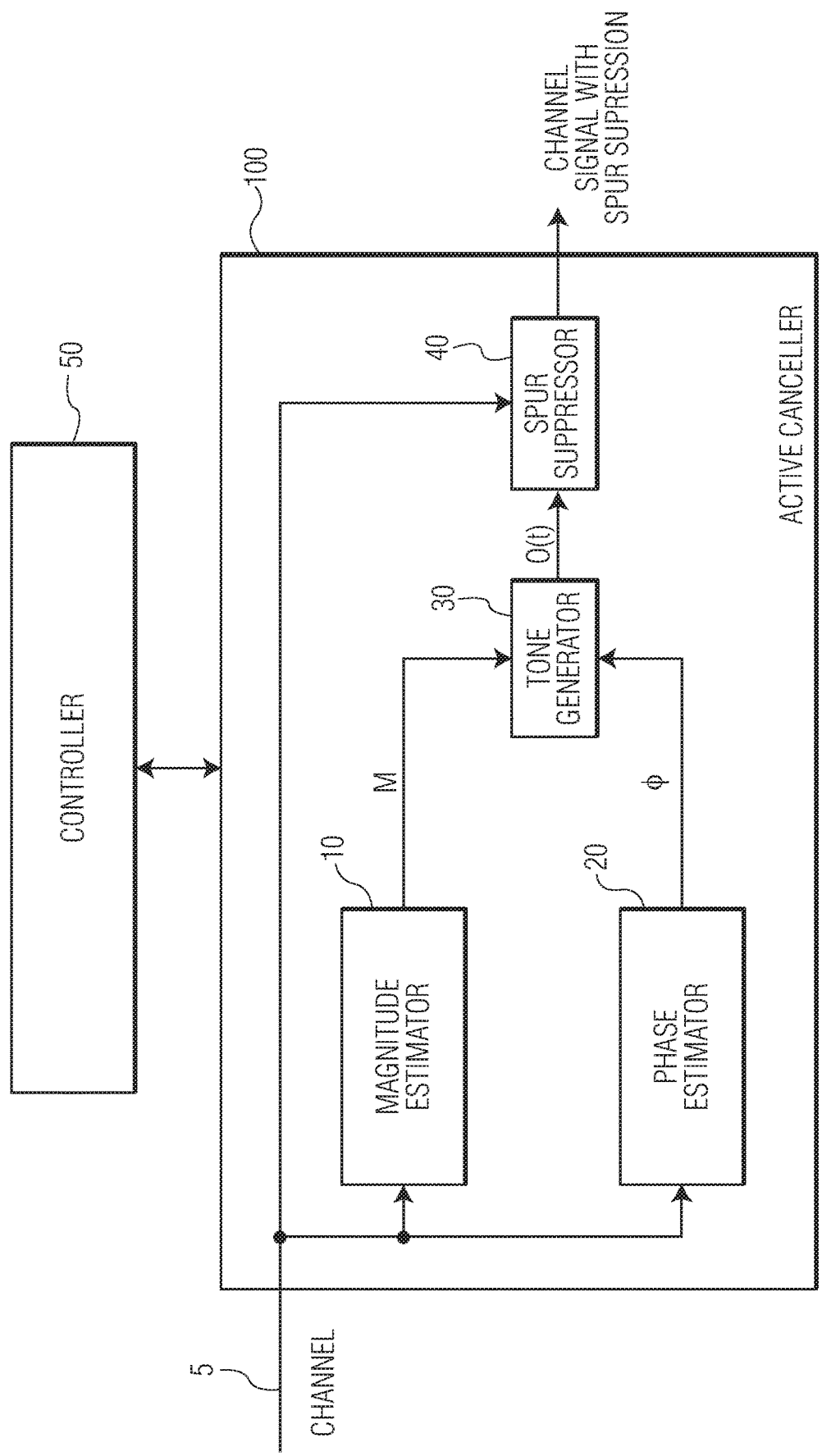
FIG. 1 illustrates an embodiment of an active canceller.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Various attempts have been made to suppress the presence of spurious signals. For example, one technique involves using a notch filter at frequencies where spurious harmonics are known to exist. However, this technique attenuates portions of the signal (which, in turn, may generate a packet error rate (PER) floor) and is not effective in suppressing all of the noise.

FIG. 1 illustrates an embodiment of an active canceller 100 that may be used to suppress spurious signals, which, for example, may appear as harmonics in an electronic system or device. The electronic device may be an integrated circuit chip, computer system, communication equipment, network devices (e.g., servers, routers, etc.), as well as various other types of processing systems. In one embodiment, the active canceller may be in, or coupled to, the receiver of a smartphone or other communication device. Accordingly, noise (e.g., harmonics) generated by spurious signals may appear in data, control, or other types signals compatible with Bluetooth, WiFi, cellular, and other communication standards. For illustrative purposes, the active canceller will be described as operating within a communications receiver.

Referring to FIG. 1, the active canceller 100 includes a magnitude estimator 10, a phase estimator 20, a tone generator 30, and a spur suppressor 40. These features may be coupled between the demodulation and mixing circuits of the receiver and a baseband signal processor, the latter of which performs data recovery for the intended application of the device in which the active canceller is located or with which the active canceller is used or coupled to. In addition to these features, a controller 50 may be included for controlling operation of the magnitude estimator, the phase estimator, tone generator, and/or spur suppressor. The controller may be included in the active canceller or may be coupled to the active canceller, for example, in order to generate enable/disable signals, control parameters, and local clock and/or other timing signals, as well as other signals for controlling operation of the active canceller within its intended application (e.g., to support operation of the receiver). In one embodiment, the controller may be omitted. In this case, the features of the active canceller may be self-executing, for example, based on internal logic in these features.

The magnitude estimator 10 estimates the magnitude M of spurious signals present at one or more predetermined frequencies of a received signal 5. The one or more predetermined frequencies are ones where spurious signals have previously and consistently been known to form in a receiver channel. In one embodiment, the magnitude estimation may be performed during a lead time before data packets are received on the channel, so that suppression may be effective from the initial point of operation of the receiver or receipt of a call, message, or other form of communication.

The phase estimator 20 estimates the phase of the spurious signals in the channel. Like the magnitude, the phase may be estimated during the lead time or anytime thereafter. In one embodiment, the phase may be determined using a two-step operation, where the first step includes generating a coarse phase estimate of the signal spurious signals on the receiver channel and the second step includes generating a fine estimate of the phase of the signal spurious signals based on the coarse estimate. The fine phase adjustment may be performed on an incremental basis until the phase (1) of the signal spurious signals (e.g., the spur harmonics) are determined, at least to within a predetermined error amount. Such an embodiment is described in greater detail below.

The tone generator 30 generates a tone signal based on the outputs of the magnitude estimator and the phase estimator. In one embodiment, the tone signal may be generated, for example, by modulating a reference waveform with the estimated magnitude and the estimated phase of the spur signals on the receiver channel to generate an offset signal waveform O(t). The resulting tone signal effectively represents a correction waveform that is to be input into the spur suppressor. The reference waveform may be, for example, a sine waveform with a frequency set to correspond to one or more of the frequencies of harmonics generated by the spurious signals. The reference waveform may be different from a sine wave in another embodiment.

The spur suppressor 40 suppresses the spurious signals (e.g., expressed as harmonics) in the receiver channel based on the offset signal waveform O(t). In operation, the spur suppressor combines, or mixes, the offset signal waveform with data signals on the channel. This combination, or mixing, suppresses or eliminates harmonics generated by the spurious signals at predetermined frequencies or frequency bands. The result is to produce a receiver signal with much less noise, which improves signal quality and the attendant performance of the receiver. Suppression of these harmonics is performed in the time domain, and therefore use of techniques (e.g., fast Fourier transform, etc.) for transforming the channel signals into the frequency domain may not be performed according to at least one embodiment. This saves time and money and reduces circuit complexity. In one embodiment, the active canceller may be periodically recalibrated (or configured) to match changes in the spurious signals and/or the frequencies at which their associated harmonics are generated.

Figure 2:
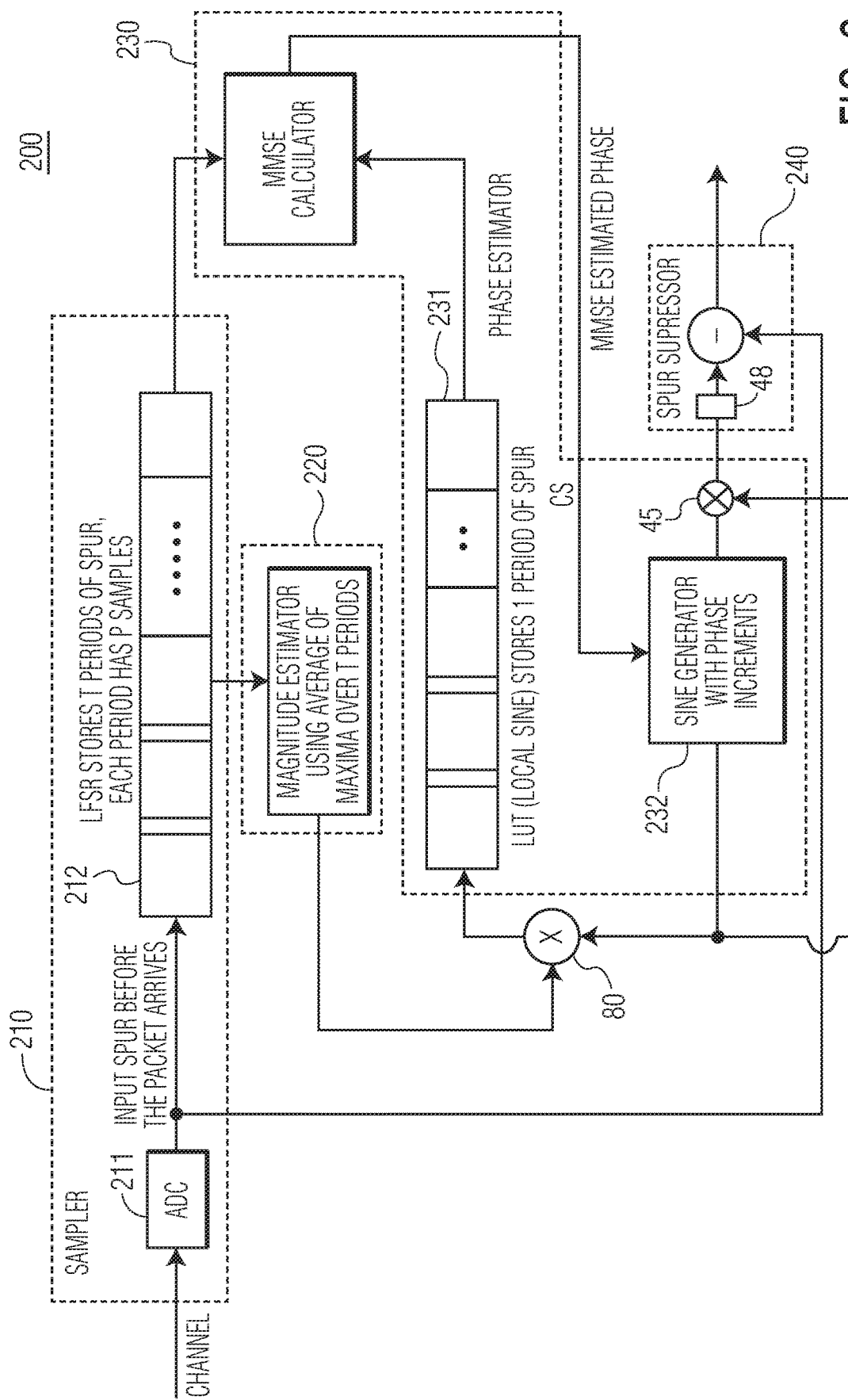
FIG. 2 illustrates an embodiment of an active canceller.

FIG. 2 illustrates an embodiment of an active canceller 200, which, for example, may be a digital implementation of the active canceller of FIG. 1. The active canceller 200 includes a sampler 210, a magnitude estimator 220, a phase estimator 230, and a spur suppressor 240. These features may be controlled, for example, by controller 50. In one embodiment, the controller may be omitted. In this case, the features of the active canceller may be self-executing, for example, based on internal logic in these features.

The sampler 210 includes an analog-to-digital converter 211 and a linear feedback shift register 212. The analog-to-digital converter 211 converts an incoming receiver channel signal to a digital signal based on a predetermined sampling rate. In one embodiment, the receiver channel signal initially may not include communication packet data, but rather may be representative of spurious signals that produce noise in the form of harmonics at one or more predetermined frequencies or frequency bands, which, for example, may include clock signal frequencies, communication frequencies, or other types of frequencies. In this case, the spurious signals may be received, for example, during a calibration or test period, lead time of an operational period, or another period during which communication packets are not necessarily transmitted.

The linear feedback shift register 212 stores T periods of spurious signals, where T>1. In one embodiment, each input bit of the register 212 may be a linear function of its previous state. Because operation of the register is deterministic, the stream of values produced by the register may be completely determined by its current (or previous) state. Likewise, because the register has a finite number of possible states, it may eventually enter a repeating cycle. The shift resister 212 is able to store the spurious signals over T periods because the one or more frequencies at which the spur signals (harmonics) occur in the channel are known, for example, through prior testing or calibration. In each of the T periods, the register may store P samples of the spurious signals, where P 1. In operation, the linear feedback shift register outputs samples to the magnitude estimator and the phase estimator.

In one example application, spurious signals input into an RF receiver generate harmonics in a channel center frequency of 2440 MHz. The spurious signals may appear at the intermediate frequency (IF) after IF down-conversion. In this case, the IF is 2 MHz. In such an implementation, the analog-to-digital converter 211 may have a sampling rate of 16 MHz and the linear feedback shift register 212 may store samples of the spurious signals over four periods (T=4), with eight samples per period (P=8).

The magnitude estimator 220 receives the samples output from the linear feedback shift register 212 and generates an estimation of the magnitude of the spurious signals over time (e.g., over time period T), which will be used for purposes of spur suppression. The magnitude estimation may be generated in various ways. In one embodiment, the magnitude of the spurious signals may be estimated based on calculating an average of maxima of the samples stored in the linear feedback shift register 212 over the T periods. The average of the maxima may be considered one way of calculating an accurate estimation of the magnitude of the spurious signals in the receiver channel.

Figure 3:
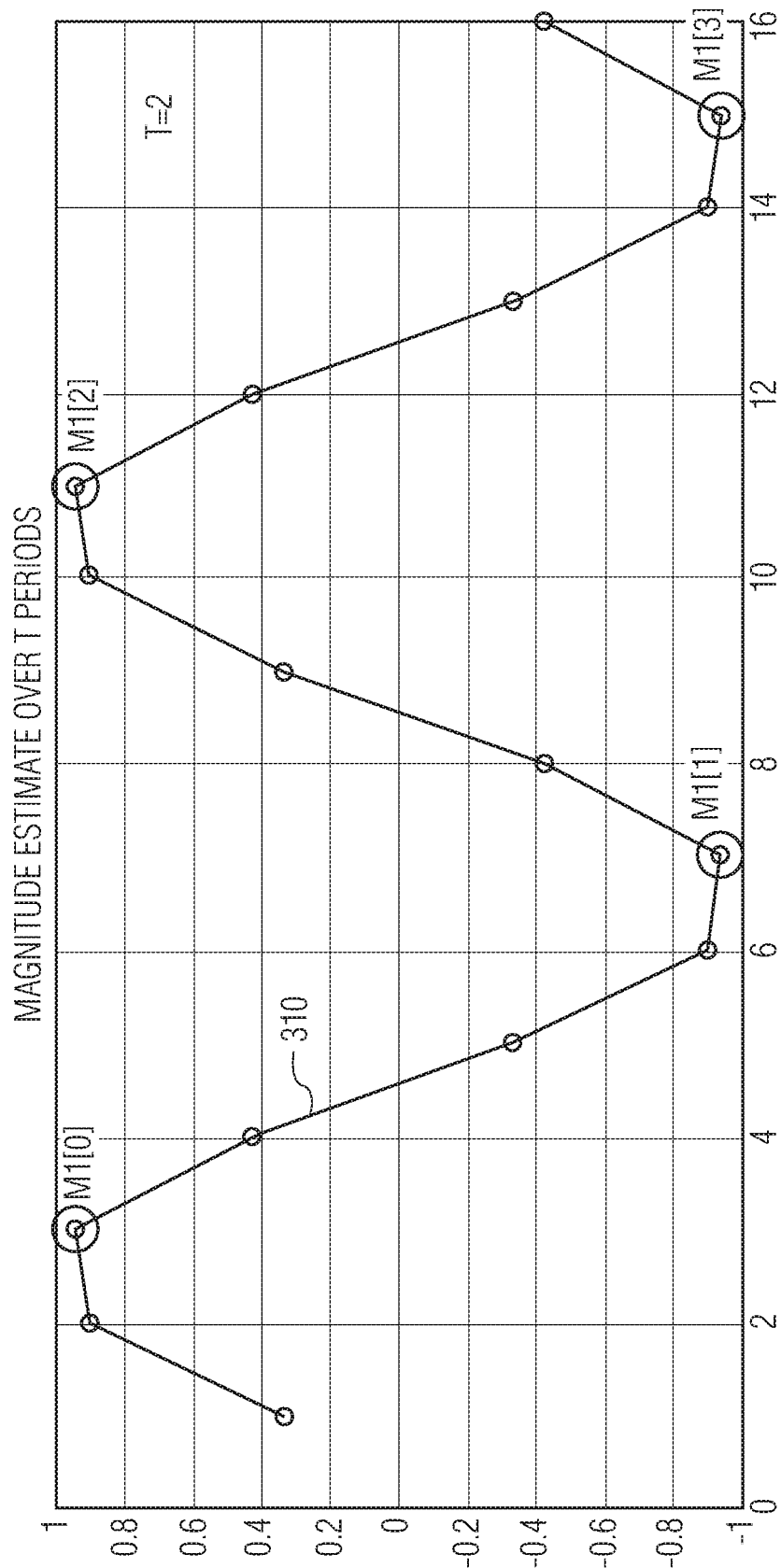
FIG. 3 illustrates an example of estimating magnitude of spurious signals.

FIG. 3 illustrates an example of a time-varying waveform generated based on the samples output from register 212. The curve 310 is generated by connecting a plurality of points 320 correspond to respective ones of the samples stored in the linear feedback shift register over the T periods. The magnitude estimator 220 may analyze the points 320 to determine the magnitude of the spurious signals in the channel. For example, in an initial operation the magnitude estimator 220 may search through the points 320 on the curve to identify absolute values of maxima of points 320.

In the example of FIG. 3, the points span over two periods (T=2) which equals the time periods during which shift register 212 collected samples from the receiver channel.

The magnitude estimator, thus, determines that the samples on curve 310 have four maxima M1[0], M1[1], M1[2], and M1[3], with one absolute value maximal point (circled) per each corresponding one-half period of the two total periods. After the absolute maximal points have been identified, the maxima estimator 220 calculates an average of the magnitudes of the absolute maximal points to derive a value that corresponds to an estimate of the magnitude of the spurious signals in the channel. In other example, the samples may be taken over a different number of periods. The number of points on curve 310 may increase as the number of sampling periods and/or the sampling rate increases. This may produce a more accurate curve, which, in turn, may generate a more accurate estimation of the magnitude of the spurious signals.

The phase estimator 230 generates an estimation of the phase of the spurious signals on the receiver channel. The phase estimator may generate this estimation concurrently with the magnitude output from the magnitude estimator. The phase may be estimated in various ways.

Figure 4:
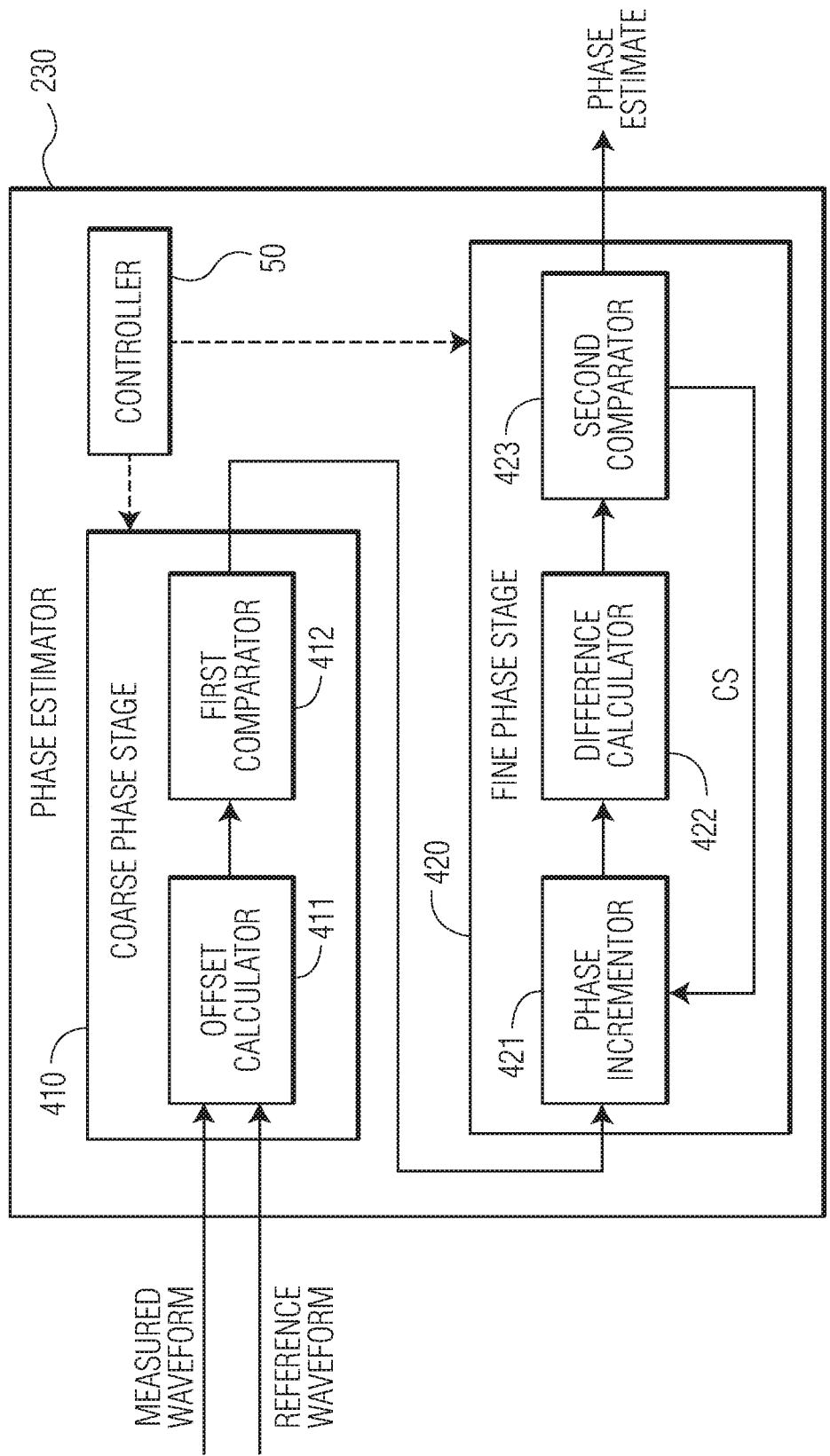
FIG. 4 illustrates an embodiment of a phase estimator.

FIG. 4 illustrates an embodiment of phase estimator 230 that implements an example of how phase estimation may be performed. In this embodiment, the phase estimator 230 generates a phase estimate of the spurious signals using a two-stage approach, with each stage having a different level of granularity in terms of producing a phase estimate. The first stage 410 generates a coarse estimate of the phase of the spurious signals. The second stage 420 generates a fine estimate of the phase of the spurious signals. The fine estimate may be output as the estimated phase of the spurious signals on the channel.

In one embodiment, the coarse phase estimator 410 may operate based on samples stored in a look-up table, such as LUT 231. This look-up table may store a plurality of sample values corresponding to different reference waveforms. According to this embodiment, the coarse phase estimator may locate the first value of the spurious signals. The first value may be, for example, the first point on curve 520 in FIG. 5 (discussed below). This first point has a value of approximately 0.35. Next, the coarse phase estimator 410 may locate the two samples in the LUT 231 that are closest to the value of 0.35, corresponding to the first spur value. This may produce two points (points 2 and 8 on the reference waveform curve 510 in FIG. 5). The phase angle of the corresponding waveform indicated in the look-up table 231 may serve as the coarse phase estimate, to be input into the fine phase estimator.

In another embodiment, the coarse phase estimator 410 may take a different approach. For example, referring to FIG. 4, the first stage 410 may include an offset calculator 411 and a first comparator 412. The offset calculator 411 receives a reference waveform and a measured waveform corresponding to the spurious signals in the receiver channel. The reference waveform may include, for example, a sine wave having a magnitude that corresponds to the output of the magnitude estimator. The measured waveform corresponding to the spurious signals may be generated based on one or more of the samples stored in the linear feedback shift register over at least one period. For illustrative purposes only, the measured waveform will be discussed as corresponding to the samples taken over one period T. This one period may, for example, be the first of the T periods of the samples collected in the linear feedback shift register.

Once the reference and measured waveforms have been received, the offset calculator 411 determines the absolute values of differences between the two waveforms. This may be accomplished on a discrete point-by-point basis. Each of the points may correspond to one of the sample points stored in the linear feedback shift register over the period T under consideration. In operation, the offset calculator 411 determines the absolute value of the difference between points on the reference and measured waveforms for each sample time t over the time period T.

The first comparator 412 receives the different values from the offset calculator and then determines the time t during period T which has the minimum difference. The sample point of the reference waveform that corresponds to time t is then used as the starting phase of the coarse estimate of the phase of the spurious signals. If there is more than one time with the same minimum difference, then the sample point corresponding to any one of those times may serve as the starting phase of the coarse estimate of the phase of the spurious signals.

Figure 5:
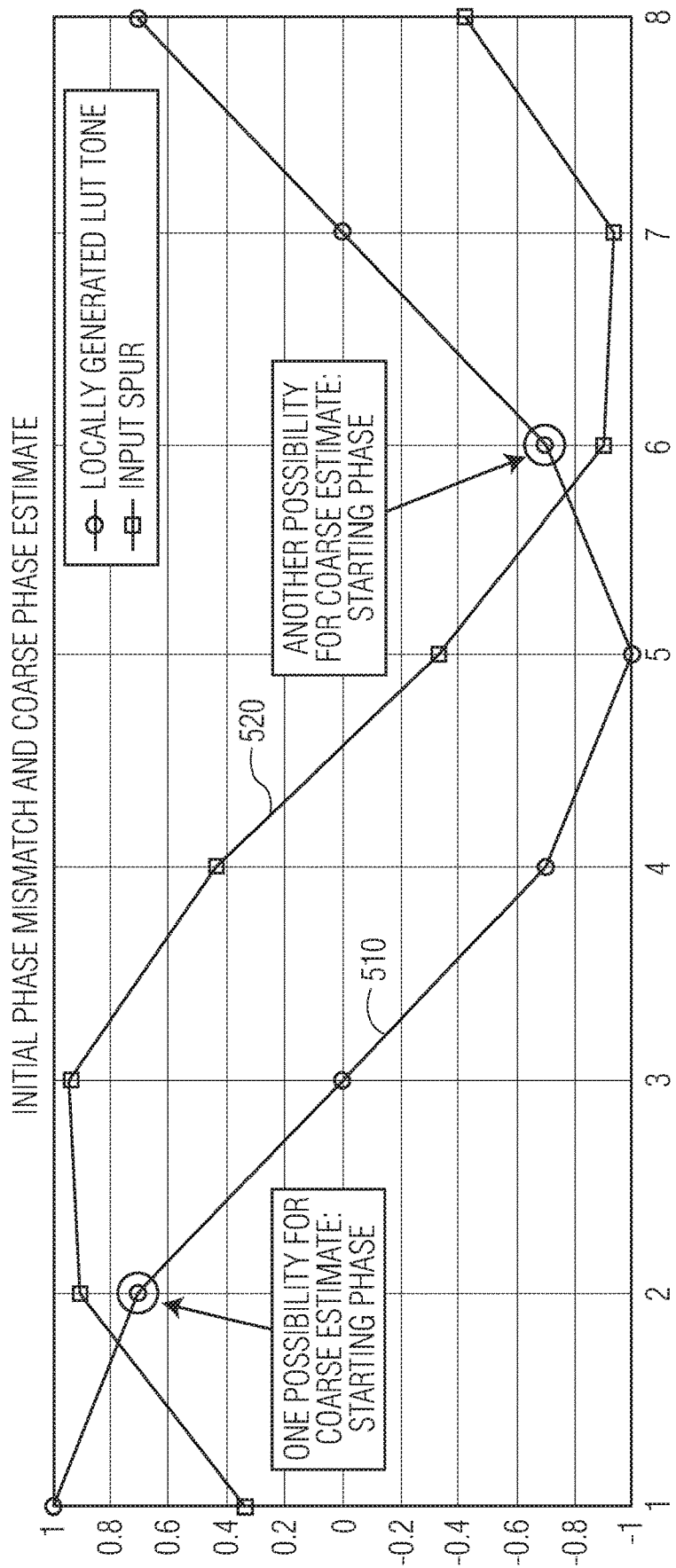
FIG. 5 illustrates an example of performing coarse phase estimation.

FIG. 5 illustrates an example of how a coarse estimate may be determined for a reference waveform 510 (e.g., a locally generated LUT tone) and a measured waveform 520. In this example, the reference waveform is generated based on the estimated magnitude of the spurious signals output from the magnitude estimator. For example, in the case where the reference waveform is a sine wave, the reference waveform is adjusted in magnitude based on the estimated magnitude of the spurious sine wave. The reference waveform frequency may be predetermined, for example, based on testing or a calibration operation for the receiver channel. For example, the waveform frequency may be determined based on the channel center frequency, e.g., 2440 MHz as previously discussed.

Once the waveform has been generated, samples are output from the linear feedback shift register to form one cycle of the measured waveform over the period T. The samples may correspond to any period T over which the samples in the shift register were taken. In one embodiment, the samples may correspond to the first period T in the shift register. Because there may be P samples per period T, the sample points in the measured waveform may be equally spaced by at T/P time intervals. For example, when p=10, the first sample point in the measured waveform may occur at t=T/P, the second sample point in the measured waveform may occur at t=T/2P, and so on up to the last point which corresponds to t=T/10P. In FIG. 5, less than a complete cycle of each of the reference and measured waveforms are shown for times t=1 to t=8.

The offset calculator 411 calculates an absolute value of the difference in point values (in amplitude) between the reference waveform and the measured waveform at each point t. Once the absolute differences values are determined for all sample point times over period T, the first comparator 412 compares the absolute values to determine the one having the minimum value. The minimum absolute difference value is designated as the coarse estimate for the spurious signals. The coarse estimate may indicate the starting phase of the spurious signals for use in calculating a fine phase estimate. In the example of FIG. 5, there are two points which have minimum absolute difference values. These occur at time t=1 and time t=6. Either of these points may be used as the coarse estimate for indicating the starting phase of the fine phase estimate. The phase estimator may be controlled, for example, to select the first point as the starting phase for the fine estimate.

An example of the coarse estimator of FIG. 4 is shown in FIG. 2 by the mixer 80 and the look-up table (LUT) register 231. The mixer mixes a sine wave output from a sine wave generator 32 with the magnitude output from the magnitude estimator to generate to generate the reference waveform RW, which, for example, may be given by Equation 1.

$$RW = M_{estimate} \sin(\omega t + \theta), \quad (1)$$

where $M_{estimate}$ is the estimated magnitude of the spurious signals over time t, where t corresponds to the sample times over period T, θ corresponds to the angles over one 360° cycle, and ω may be the receiver channel frequency or the frequency of the spurious signals.

The LUT register 231 may store the values of the reference waveform (e.g., the locally generate sine wave) for one period T of the spurious signals at points corresponding to the sample points in the measured waveform for the spurious signals, e.g., at sample times t. Each block in the LUT register 31 may store a corresponding value at a respective one of the sample points in the reference waveform.

Once the reference waveform is generated, the offset calculator 411 and the first comparator 412 may operate as previously described to determine the starting phase as a coarse estimate. The starting phase is then input into the fine phase stage.

In another embodiment, the coarse phase estimator 410 may be omitted and the fine phase estimator 420 may be relied onto to generate the phase of the spurious signals on the channel. In this embodiment the fine phase estimator 420 may start with any start angle.

In another alternative embodiment, the fine phase estimator 420 may start with a start angle that is based on the coarse phase estimate. For example, fine phase estimator 420 may start with an angle that is the coarse phase angle—½ the coarse phase increment. Then, the fine phase estimator may begin searching for the fine phase estimate of the spurious signals by iteratively performing incremental phase shifting until the minimum mean square error is reached.

Returning to FIG. 4, the fine phase stage 420 includes a phase incrementor 421, a difference calculator 422, and a second comparator 423. The phase incrementor 321 performs an initial operation for purposes of adjusting the coarse phase estimate, reflected in the reference waveform (and its associated starting phase), to a fine phase estimate. The adjustment is performed by shifting the reference waveform corresponding to the coarse phase estimate by one or more predetermined increments. In one embodiment, the phase incrementor may shift the reference waveform by at least one of plus or minus increments (e.g., right phase-shift or left-phase shift, respectively). The increments may be linearly applied constant values or may be selected in a non-linear manner. In one example, the phase-shift increments may be consistently applied π/32 increments, e.g., each phase shift may be 5.625°. Thus, an initial operation of the phase incrementor 421 includes shifting the reference waveform by 5.625° in a predetermined direction relative to the starting phase the coarse phase estimate.

The difference calculator 422 calculates the difference between the shifted reference waveform and the measured waveform. This may be performed, for example, by subtracting the values of the shifted reference waveform from the values of the measured waveform at respective ones of the sampling points over the period T. For example, when the phase incrementor shifts the reference waveform to the right by a first phase increment (e.g., +5.625°), the difference calculator may generate an aggregate different value equal to the sum of the difference values generated between the reference waveform and the measured waveform at respective ones of sampling points. When the phase incrementor increments the reference waveform iteratively (e.g., because the best fine phase estimate has not yet been attained), the difference calculator may generate a plurality of corresponding aggregate difference values.

The second comparator 423 compares the aggregate difference value output from the different calculator 422 to the previously generated aggregate difference value. In the case of the first aggregate difference value generated for the first incremental shift of the reference waveform 610, the second comparator 423 may compare the first aggregate different value to the aggregate difference value generated between the (unshifted) reference waveform 510 output from the coarse phase generator and the measured waveform 520. If the difference between these aggregate difference values is greater than the aggregate distance value generated for the unshifted reference waveform 510, then the second comparator 423 may generate a control signal CS indicating that the phase increments are being shifted in the wrong direction (e.g., in a direction that is a worse estimate of the measured waveform) and thus should begin to be shifted in the opposite direction. The control signal CS may be input directly into the phase incrementor 421, which may then reverse the direction of the phase increments applied to the reference waveform, or the control signal CS may be input into a controller which then outputs another control signal to the phase incrementor to reverse direction of the phase increments.

Figure 6:
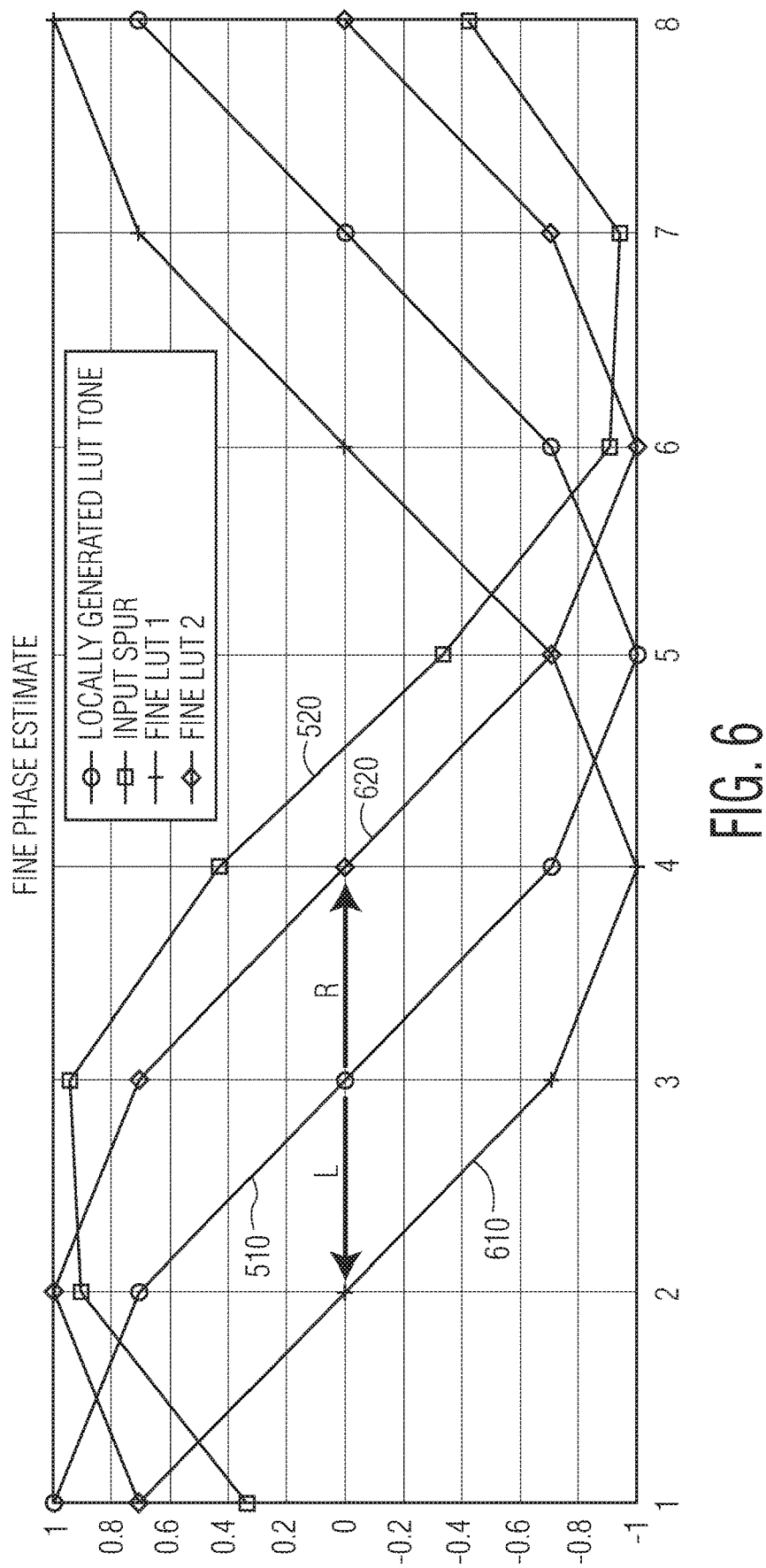
FIG. 6 illustrates an example of performing fine phase estimation.

FIG. 6 illustrates an example of a wrong directional shift performed by the phase incrementor 411. In FIG. 6, the first incremental shift (e.g., −5.625°) of reference waveform 510 corresponds to waveform 610, as indicated by Arrow L. The distances between the values of waveform 610 and the values of the measured waveform 520 at respective ones of the sampling points is greater than the distances between the values of (unshifted) waveform 510 and the measured waveform 520 at respective ones of the sampling points. In this case, the second comparator 423 may output a control signal CS having a first logical value indicating that the phase-increment direction should be changed. When the phase incrementor 421 receives the control signal CS, the phase incrementor may generate a phase increment in the opposite direction (e.g., +5.625°), indicated by Arrow R, relative to the unshifted reference waveform 510 during a second iteration.

When the second comparator 423 determines that the aggregate difference value generated for the first increment shift (or the second-increment shift after a direction reversal) is less than the aggregate difference value generated for the unshifted reference waveform 510, the control signal CS may have a different logical value indicating that the phase incrementor 421 should shift the reference waveform again by an additional increment in the same direction, e.g., another +5.625° in the example considered above. When this occurs, the difference calculator calculates an aggregate difference value for the reference waveform shifted by a second phase increment and the measured waveform. In one implementation, a search may be done in one direction until the minimum value is found.

The second comparator 423 then compares this difference to the previously generated difference. If the difference generated for the second incremental shift is less than for the first incremental shift, the second comparator generates control signal CS with a logical value indicating that an additional phase increment should be performed. This process may continue iteratively until the difference between the phase-shifted reference waveform and the measured waveform reaches a predetermined or minimal amount. The phase of the reference waveform at this point may then be considered to be a fine phase estimate for purposes of suppressing harmonics generated by spurious signals in the channel.

In one embodiment, the second phase stage 420 may be implemented by a minimum mean square error (MM SE) calculator 425, for example, as illustrated in FIG. 2. The MM SE calculator 425 may be implemented in logic which, for example, may functionally perform the operations of one or more of the phase incrementor 411, the difference calculator 412, and the second comparator 423. For example, in one embodiment the difference calculator 412 may calculate minimum mean square differences between the values of each incrementally phase-shifted reference waveform and the measured waveform. If the shift direction is proper, the MM SE calculator 425 will output ever-decreasing values until a minimum value is reached. The MM SE calculator 425 determines that a minimum value is reached when the minimum mean square difference calculated for a next phase-incremented reference waveform generates a value that is greater than the minimum mean square difference value generated for the immediately preceding phase increment. In this case, the phase that corresponds to the immediately preceding phase increment constitutes the fine phase estimate to be used for suppressing spurious signals in the channel.

Figure 7:
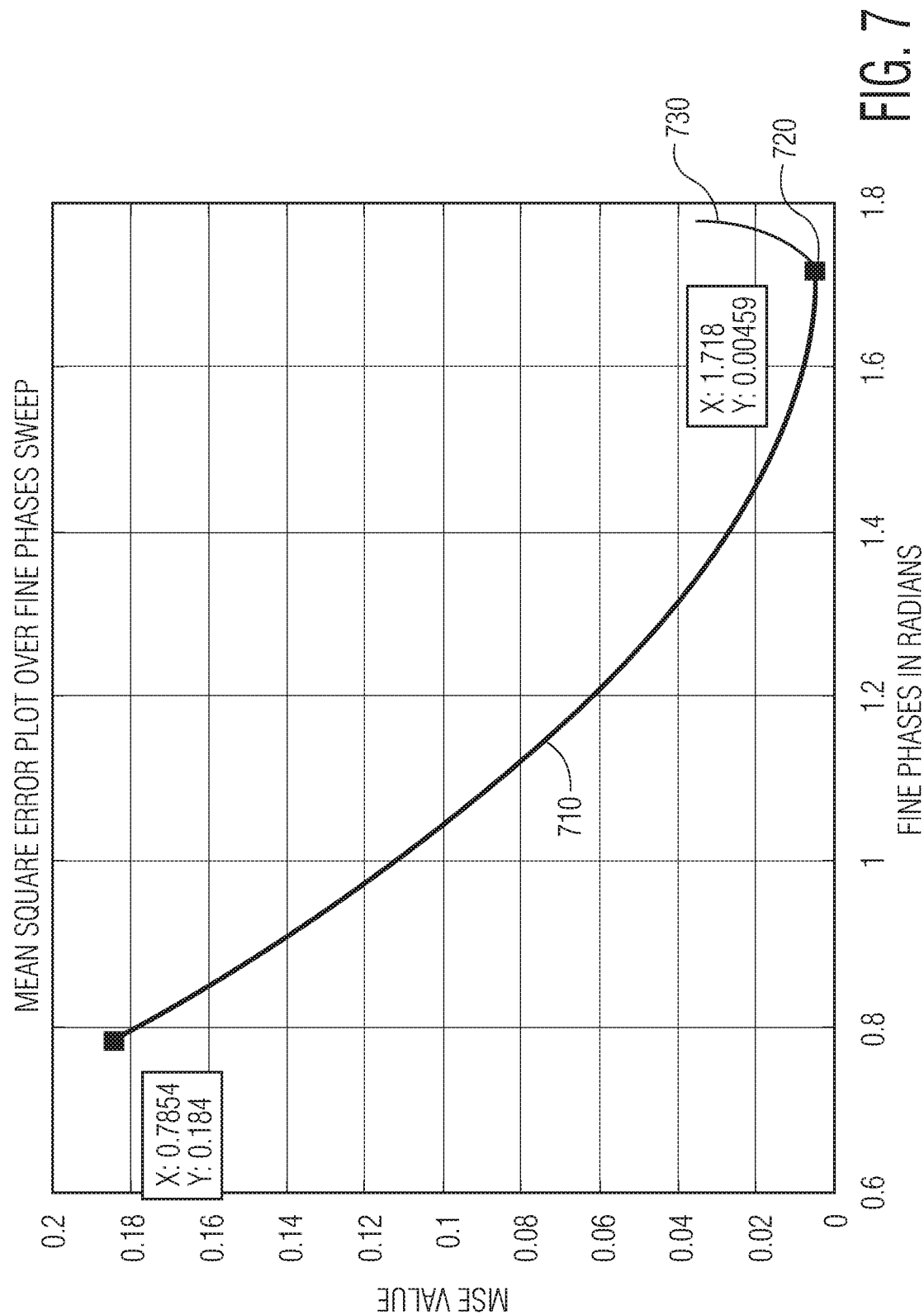
FIG. 7 illustrates an embodiment for performing fine phase estimation.

FIG. 7 illustrates an example of the output of the MM SE calculator 425 as previously described. The initial point (X=0.7854, Y=0.184) may correspond to the first value output from the MM SE calculator (e.g., once the proper direction of phase incrementation is determined). As the reference waveform is iteratively shifted by more and more phase increments, the resulting minimum mean square different values continue to decrease, as indicated by the descending portion of curve 710. At point 720, the minimum is reached. However, the MM SE calculator 425 (and/or the controller) does not determine that the minimum point has been reached until the next iteration, where the difference between the next phase-shifted reference waveform and the measured waveform is greater than the preceding difference, as indicated by portion 730 of curve 710. At this time, the MM SE calculator (or controller) determines that the phase corresponding to point 720 constitutes the phase to be used for performing suppression of the spurious signals.

In one embodiment, as illustrated in FIG. 2 the MM SE calculator 425 may function as the difference calculator 412 which outputs control signal CS to a reference waveform generator 426, which increments the phase and applies the incremented phase to generate a next-shifted reference waveform to be compared to the measured waveform. In this case, the next-shifted reference waveform may be multiplied by the magnitude output from the magnitude estimator, and then values corresponding to respective ones of the sample points may be stored in the look-up table 428. These values are then input into the MM SE calculator 425 to generate a next-corresponding minimum mean square difference value. The MM SE calculator may perform the comparison of this value to the previous value (e.g., perform the operation of the second comparator) or this operation may be performed by the controller.

Once the magnitude and fine phase estimates have been determined, these values may be input into the reference waveform generator to generate a suppression waveform. The suppression waveform may be generated by multiplying the reference waveform output from the waveform generator 232 with the estimated magnitude output from the magnitude estimator, in multiplier 45, at the phase output from the phase estimator. The gain of this waveform may optionally be adjusted, by gain controller 48, to generate the suppression waveform. The gain may correspond to the gain applied to signals received on the channel. The suppression waveform may be subtracted from subsequent signals (including data packets) on the channel to suppress the spurious signals and thus to generate a baseband signal with improved signal-to-noise quality.

Figure 8:
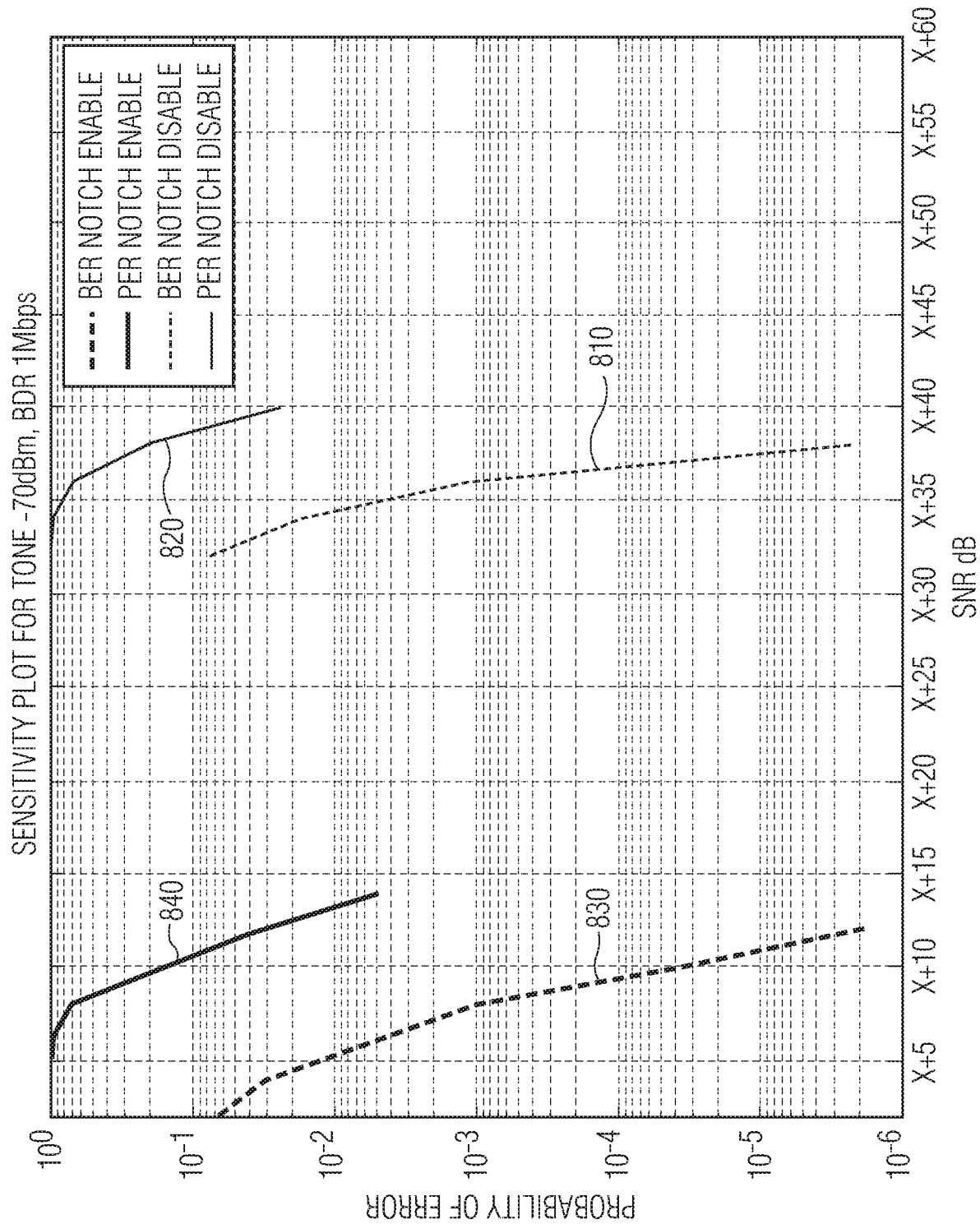
FIG. 8 illustrates an example of spurious signal suppression.

FIG. 8 illustrates an example of results obtained for one embodiment of the active canceller. In this example, the active canceller was applied to a receiver having a bandwidth requirement (BDR) of 1 Mbps and the channel spur was at −70 dBm. In this graph, the top horizontal axis indicates sensitivity of the tone signal, the vertical axis indicates probability of error (on a logarithmic scale) of signals transmitted on the channel, and the lower horizontal axis indicated signal-to-noise ratio (SNR) measured in decibels dB. Four curves are plotted on the graph for four corresponding cases relating to whether the notch filter (e.g., the active canceller) is enabled to disabled. Curve 810 indicates bit error rate (BER) when the active canceller (notch) is disabled. Curve 820 indicates probability of error (PER) when the active canceller is disabled. Curve 830 indicates the BER when the active canceller is enabled. Curve 840 indicates the PER when the active canceller is enabled. The active filter may be enabled and disabled, for example, based on a signal generated from the controller and/or host device. As illustrated in FIG. 8, when the active canceller (notch) is disabled, the BER and PER is elevated. Conversely, when the active canceller (notch) is enabled, the BER and PER are reduced significantly, generating an much improved SNR.

The spurious signals may be generated from a variety of sources. For example, in one case at least some of the spurious signals may be generated by a local clock signal generators using a common reference for the receiver. Generation of these clock signals may be treated as a locally generated tone by the active canceller that will also have the same frequency offset in parts-per-million (PPM) as other types of devices or noise sources that generate spurious signals. In some cases, the spurious signals may have the same carrier frequency and the same sampling frequency offset. Receiver logic may be included to perform frequency offset correction that is modeled, for example, by C-language simulations performing phase compensation.

The values in the look-up tables may be stored in corresponding buffers. While filling up the buffers, automatic gain control (AGC) coarse gain change in the receiver signal path may be blocked, e.g., based on one or more signals from the controller. Any gain changes after the tone estimate is performed may be compensated by applying an equal gain difference application on the locally generated tone. After the spur estimation is performed and as soon as the cancellation starts, the output of the active canceller may become negligible due to tone cancellation. Additionally, in some implementations ADC under-run and AGC reset may be blocked by the controller.

Figure 9:
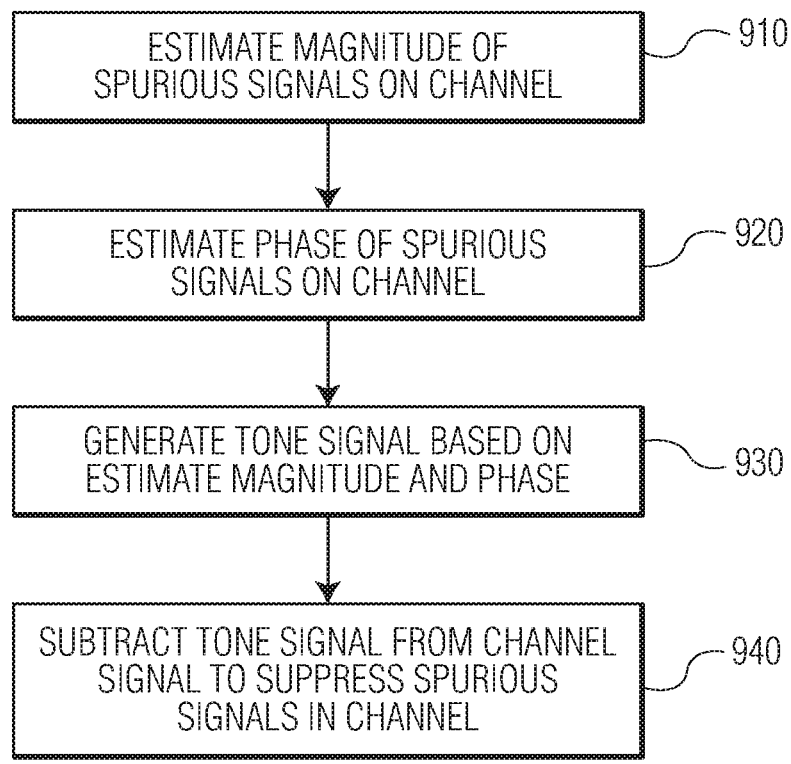
FIG. 9 illustrates an embodiment of a method for suppressing spurious signals.

FIG. 9 illustrates an embodiment of a method for suppressing spurious signals, which, for example, may be communicated along a channel of a communications receiver. In another embodiment, the spurious signals may be suppressed along a different type of signal path, including but not limited to signal paths in a computer, integrated circuit chip, processing system, or any other type of device or system which noise signals may be present.

Referring to FIG. 9, the method includes estimating a magnitude of spurious signals in the channel at 910, estimating a phase of the spurious signals in the channel at 920, generating a tone signal (e.g., shifted reference waveform) based on the estimated magnitude and phase at 930, and subtracting the tone signal from the channel signal to suppress the spurious signals at 940. The magnitude and phase of the spurious signals are estimated and the tone signal is subtracted from the channel signal in the time domain.

Estimating the magnitude may include storing samples of the spurious signals over N periods, determining maximal points in each of the one or more time periods, and performing a statistical operation based on the maximal points to calculate the estimated magnitude of the spurious signals, wherein N≥1. Estimating the magnitude may further include storing the samples in a linear feedback shift register, wherein P samples are stored in the linear feedback shift register for each of the N time periods, where P≥1. Storing the samples of the spurious signals may be performed before the channel signal is received.

Estimating the phase may include generating a coarse estimate of the phase of the spurious signals and generating a fine estimate of the phase of the spurious signals based on the coarse estimate of the phase. Generating the coarse estimate may include generating a reference waveform based on the estimated magnitude and generating difference values between first points on the reference waveform and second points on a measured waveform generated by the spurious signals, where the first points and second points corresponding to a respective number of sample points. Additional operations include determining a difference value of the difference values having a lowest value, determining a phase angle corresponding to the difference value having the lowest value, and determining the coarse phase estimate based on the phase angle.

Generating the fine estimate may include (a) generating a reference waveform based on the coarse phase estimate and the magnitude estimate, (b) shifting the reference waveform by a predetermined phase increment, (c) comparing the shifted reference waveform to a measured waveform corresponding to the spurious signals, (d) generating a difference value based on the comparison, (e) repeating (b) to (d) to generate one or more additional difference values, f) determining a difference value of the difference values generated in (d) and (e) having a least value, (g) determining a phase angle of the shifted reference waveform that corresponds to the difference value having the least value and (h) determining the fine phase estimate based on the phase angle. Operation (c) may include generating first values by subtracting first point values of the shifted reference waveform from second point values of the measured waveform at respective sampling times and generating a minimum mean square error value based on the first values, where the difference value generated in (d) is based on the minimum means square error value. Operation (a) may include storing the first point values in a look-up table before generating the first values. Subtracting the tone signal from the channel signal may include suppressing harmonics in the channel signal corresponding to the spurious signals.

Figure 10:
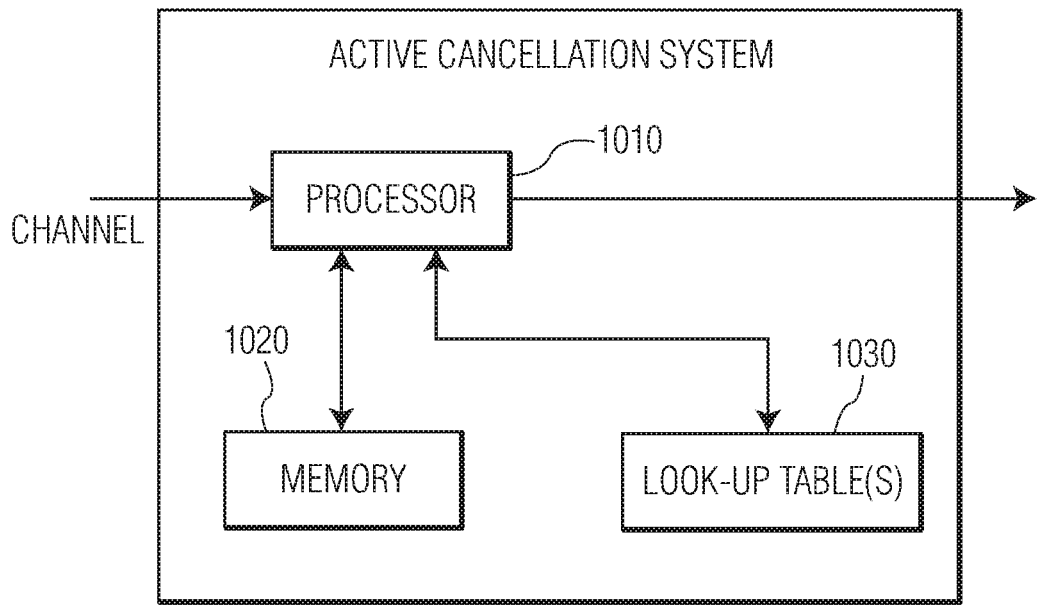
FIG. 10 illustrates an embodiment of an active cancellation system.

FIG. 10 illustrates a system for suppressing spurious signals, which, for example, may be communicated along a channel of a communications receiver, processing system, or other device. The system includes a processor 1010, a memory 1020, and at least one look-up table 1030. The memory 1020 may be a non-transitory computer-readable medium (e.g., read-only memory or random access memory) that stores instructions which may be executed by the processor 1010 for performing the operations of the embodiments described herein. For example, the processor may execute these instructions to estimate a magnitude of spurious signals in the channel, estimate a phase of the spurious signals in the channel, generate a tone signal based on the estimated magnitude and phase, and subtract the tone signal from the channel signal to suppress the spurious signals. As previously indicated, the magnitude and phase of the spurious signals may be estimated and the tone signal may be subtracted from the channel signal in the time domain. The look-up table(s) may be any of those illustrated in FIG. 2 for storing samples or values of reference and/or measured waveforms corresponding to sample times. The processor may execute instructions in the memory for performing other described operations.

The controllers, processors, estimators, generators, suppressors, converters calculators, comparators, incrementors, and other signal-generating and signal-processing features of the embodiments disclosed herein may be implemented in logic which, for example, may include hardware, software, or both. When implemented at least partially in hardware, the controllers, processors, estimators, generators, suppressors, converters calculators, comparators, incrementors, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, estimators, generators, suppressors, converters calculators, comparators, incrementors, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. An active canceller, comprising:
   a magnitude estimator configured to:

estimate a magnitude of spurious signals on a channel;
store samples of the spurious signals over N periods;
determine maximal points in each of the one or more time periods; and
perform a statistical operation based on the maximal points to calculate the estimated magnitude of the spurious signals, wherein N≥1;
a phase estimator configured to estimate a phase of the spurious signals on the channel;
a tone generator configured to generate a tone signal based on the estimated magnitude and phase; and
a suppressor configured to subtract the tone signal from a channel signal to suppress the spurious signals, wherein the magnitude and phase estimators and the suppressor operate in the time domain.

2. The active canceller of claim 1, wherein magnitude estimate is configured to:
store the samples in a linear feedback shift register,
wherein P samples are stored in the linear feedback shift register for each of the N time periods, where P≥1.

3. The active canceller of claim 1, wherein the magnitude estimator is configured to store the samples of the spurious signals before the channel signal is received.

4. The active canceller of claim 1, wherein the phase estimator is configured to:
generate a coarse estimate of the phase of the spurious signals; and
generate a fine estimate of the phase of the spurious signals based on the coarse estimate of the phase.

5. The active canceller of claim 4, wherein the phase estimator is configured to generate the coarse estimate by:
determining a first value of a waveform corresponding to the spurious signals;
accessing a look-up table storing sample values for a plurality of reference waveforms;
determining at least one reference waveform of the plurality of reference waveforms having a sample value nearest to the first value; and
setting the coarse phase estimate based on a phase of the at least one reference waveform.

6. The active canceller of claim 4, wherein the phase estimator is configured to generate the coarse estimate by:
generating a reference waveform based on the estimated magnitude;
generating difference values between first points on the reference waveform and second points on a measured waveform generated by the spurious signals, the first points and second points corresponding to a respective number of sample points; and
determining a difference value of the difference values having a lowest value;
determining a phase angle corresponding to the difference value having the lowest value; and
determining the coarse phase estimate based on the phase angle.

7. The active canceller of claim 4, wherein the phase estimator is configured to generate the fine estimate by:
(a) generating a reference waveform based on the coarse phase estimate and the magnitude estimate;
(b) shifting the reference waveform by a predetermined phase increment;
(c) comparing the shifted reference waveform to a measured waveform corresponding to the spurious signals;
(d) generating a difference value based on the comparison;
(e) repeating (b) to (d) to generate one or more additional difference values;
(f) determining a difference value of the difference values generated in (d) and (e) having a least value; and
(g) determining a phase angle of the shifted reference waveform that corresponds to the difference value having the least value; and
(h) determining the fine phase estimate based on the phase angle.

8. The active canceller of claim 7, wherein (c) includes:
generating first values by subtracting first point values of the shifted reference waveform from second point values of the measured waveform at respective sampling times; and
generating a minimum mean square error value based on the first values,
wherein the difference value generated in (d) is based on the minimum means square error value.

9. The active canceller of claim 1, wherein the magnitude estimator and the phase estimator are configured to generate the magnitude estimate and the phase estimate, respectively, during a period when an outside signal is not received through the channel.

10. A method for suppressing noise in a channel, comprising:
estimating a magnitude of spurious signals in the channel, the estimating the magnitude includes:
storing samples of the spurious signals over N periods;
determining maximal points in each of the one or more time periods; and
performing a statistical operation based on the maximal points to calculate the estimated magnitude of the spurious signals, wherein N 1;
estimating a phase of the spurious signals in the channel;
generating a tone signal based on the estimated magnitude and phase; and
subtracting the tone signal from the channel signal to suppress the spurious signals,
wherein the magnitude and phase of the spurious signals are estimated and the tone signal is subtracted from the channel signal in the time domain.

11. The method of claim 10, wherein estimating the magnitude includes:
storing the samples in a linear feedback shift register,
wherein P samples are stored in the linear feedback shift register for each of the N time periods, where P≥1.

12. The method of claim 10, wherein storing the samples of the spurious signals is performed before the channel signal is received.

13. The method of claim 10, wherein estimating the phase includes:
generating a coarse estimate of the phase of the spurious signals; and
generating a fine estimate of the phase of the spurious signals based on the coarse estimate of the phase.

14. The method of claim 13, wherein generating the coarse estimate includes:
determining a first value of a waveform corresponding to the spurious signals;
accessing a look-up table storing sample values for a plurality of reference waveforms;
determining at least one reference waveform of the plurality of reference waveforms having a sample value nearest to the first value; and
setting the coarse phase estimate based on a phase of the at least one reference waveform.

15. The method of claim 13, wherein generating the coarse estimate includes:

generating a reference waveform based on the estimated magnitude;

generating difference values between first points on the reference waveform and second points on a measured waveform generated by the spurious signals, the first points and second points corresponding to a respective number of sample points; and determining a difference value of the difference values having a lowest value;

determining a phase angle corresponding to the difference value having the lowest value; and determining the coarse phase estimate based on the phase angle.

16. The method of claim 13, wherein generating the fine estimate includes:
(a) generating a reference waveform based on the coarse phase estimate and the magnitude estimate;
(b) shifting the reference waveform by a predetermined phase increment;
(c) comparing the shifted reference waveform to a measured waveform corresponding to the spurious signals;
(d) generating a difference value based on the comparison;
(e) repeating (b) to (d) to generate one or more additional difference values;
(f) determining a difference value of the difference values generated in (d) and (e) having a least value; and
(g) determining a phase angle of the shifted reference waveform that corresponds to the difference value having the least value; and (h) determining the fine phase estimate based on the phase angle.

17. The method of claim 16, wherein (c) includes:
generating first values by subtracting first point values of the shifted reference waveform from second point values of the measured waveform at respective sampling times; and
generating a minimum mean square error value based on the first values,
wherein the difference value generated in (d) is based on the minimum means square error value.

18. A system, comprising:
a memory configured to store instructions; and
a processor configured to execute the instructions to:
  estimate a magnitude of spurious signals in the channel;
  store samples of the spurious signals over N periods;
  determine maximal points in each of the one or more time periods;
  perform a statistical operation based on the maximal points to calculate the estimated magnitude of the spurious signals, wherein N 1;
  estimate a phase of the spurious signals in the channel;
  generate a tone signal based on the estimated magnitude and phase; and
  subtract the tone signal from the channel signal to suppress the spurious signals,
wherein the magnitude and phase of the spurious signals are estimated and the tone signal is subtracted from the channel signal in the time domain.

* * * * *